(12) United States Patent
Lyman et al.

(10) Patent No.: US 11,029,655 B2
(45) Date of Patent: *Jun. 8, 2021

(54) PROGRESSIVE PROFILING IN AN AUTOMATION SYSTEM

(71) Applicant: Vivint, Inc., Provo, UT (US)

(72) Inventors: Jefferson Lyman, Alpine, UT (US); Nic Brunson, Salt Lake City, UT (US); Wade Shearer, Lehi, UT (US); Mike Warner, Payson, UT (US); Stefan Walger, Salt Lake City, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,796

(22) Filed: Feb. 17, 2020

(65) Prior Publication Data

US 2020/0257254 A1 Aug. 13, 2020

Related U.S. Application Data

(63) Continuation of application No. 14/607,926, filed on Jan. 28, 2015, now Pat. No. 10,564,614.

(60) Provisional application No. 61/933,998, filed on Jan. 31, 2014.

(51) Int. Cl.
| | | |
|---|---|---|
| *G05B 15/02* | (2006.01) | |
| *H04L 12/64* | (2006.01) | |
| *F24F 11/30* | (2018.01) | |
| *G05D 23/19* | (2006.01) | |
| *H05B 47/105* | (2020.01) | |
| *F24F 120/10* | (2018.01) | |

(52) U.S. Cl.
CPC .............. *G05B 15/02* (2013.01); *F24F 11/30* (2018.01); *G05D 23/1927* (2013.01); *H04L 12/6418* (2013.01); *H05B 47/105* (2020.01); *F24F 2120/10* (2018.01); *G05B 2219/2642* (2013.01)

(58) Field of Classification Search
CPC ...... G05B 15/02; H04L 12/6418; F24F 11/30; H05B 47/105; G05D 23/1927
USPC ........................................................ 700/275
See application file for complete search history.

(56) References Cited

U.S. PATENT DOCUMENTS

| | | |
|---|---|---|
| 5,877,759 A | 3/1999 | Bauer |
| 7,403,838 B2 | 7/2008 | Deen et al. |
| 8,786,425 B1 | 7/2014 | Hutz |

(Continued)

FOREIGN PATENT DOCUMENTS

WO 2011007299 A1 1/2011

OTHER PUBLICATIONS

International Search Report and Written Opinion of the International Searching Authority for PCT/US2015/013439, dated Apr. 27, 2015.

(Continued)

*Primary Examiner* — Mohammad Ali
*Assistant Examiner* — Joshua T Sanders
(74) *Attorney, Agent, or Firm* — Holland & Hart, LLP (57) ABSTRACT

A computer-implemented method for progressive profiling in a home automation system is described. Data related to a premises and an occupant of the premises may be analyzed and one or more observations may be made based on the analysis of the data. Upon detecting one or more conditions associated with the one or more observations made, an offer to perform one or more actions may be communicated to the occupant.

20 Claims, 7 Drawing Sheets (56) References Cited

U.S. PATENT DOCUMENTS

| | | | |
|---|---|---|---|
| 9,548,050 B2 | 1/2017 | Gruber et al. | |
| 9,614,690 B2* | 4/2017 | Ehsani et al. | |
| 10,421,238 B2* | 9/2019 | Leonard | G06F 30/00 |
| 2004/0030531 A1 | 2/2004 | Miller et al. | |
| 2009/0195349 A1* | 8/2009 | Frader-Thompson | G01R 21/00 340/3.1 |
| 2010/0289643 A1 | 11/2010 | Trundle et al. | |
| 2011/0099142 A1 | 4/2011 | Karjalainen et al. | |
| 2012/0125592 A1 | 5/2012 | Fadell et al. | |
| 2013/0158721 A1 | 6/2013 | Somasundaram et al. | |
| 2013/0159220 A1 | 6/2013 | Winn et al. | |
| 2013/0185051 A1 | 7/2013 | Buryak et al. | |
| 2013/0297555 A1 | 11/2013 | Fadell et al. | |
| 2013/0338839 A1* | 12/2013 | Rogers | G05B 15/02 700/278 |
| 2014/0277795 A1 | 9/2014 | Matsuoka et al. | |
| 2015/0160797 A1 | 6/2015 | Shearer et al. | |
| 2015/0186357 A1* | 7/2015 | Oldham | G06F 40/263 704/8 |
| 2015/0363989 A1 | 12/2015 | Scalisi | |
| 2016/0378080 A1 | 12/2016 | Uppala et al. | |
| 2017/0076263 A1 | 3/2017 | Bentz et al. | |
| 2018/0181286 A1 | 6/2018 | Mckay et al. | |

OTHER PUBLICATIONS

Supplementary European Search Report for EP Application No. 15743043, dated Sep. 1, 2017 (3 pp.).

* cited by examiner

PROGRESSIVE PROFILING IN AN AUTOMATION SYSTEM

CROSS REFERENCE

This application is a continuation of U.S. patent application Ser. No. 14/607,926 entitled "PROGRESSIVE PROFILING IN AN AUTOMATION SYSTEM," which was filed Jan. 28, 2015, and assigned to the assignee hereof, which claims priority from U.S. Provisional Patent Application No. 61/933,998 entitled "PROGRESSIVE PROFILING IN AN AUTOMATION SYSTEM," which was filed 31 Jan. 2014, and assigned to the assignee hereof. Both of which are incorporated herein by reference.

BACKGROUND

Advancements in premises automation and security systems and media-related technologies continue to increase at a rapid pace. Increasing demand for automation and security has influenced the advances made to automation and security systems. Computer systems have increasingly become an integral part of the automation and security systems. Computer systems may be used to carry out several automation and security functions. The wide-spread access to automation and security has been accelerated by the increased use of computer networks, including the Internet and cloud networking.

Many homes and businesses use one or more computer networks to control one or more aspects of the home or business, and to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of premises automation and premises security products. In some cases, however, an automation system may perform actions that an occupant does not want automated, or may perform actions differently than how the occupant wants the actions performed. As a result, benefits may be realized by providing systems and methods for progressively profiling occupants in relation to a premises automation and security system.

SUMMARY

According to at least one embodiment, a computer-implemented method for progressive profiling in a home automation system is described. Data related to a premises and an occupant of the premises may be analyzed and one or more observations may be made based on the analysis of the data. Upon detecting one or more conditions associated with the one or more observations made, an offer to perform one or more actions may be communicated to the occupant.

In one embodiment, one or more observations may be communicated to the occupant. At least one of the observations may be based on the occupant previously performing the one or more actions under one or more conditions. In some cases, it may be confirmed with the occupant whether to perform the one or more actions offered. In some cases, an offer to perform the one or more actions may be communicated upon predicting one or more conditions before the one or more conditions occur. Upon receiving a confirmation from the occupant in the affirmative, the one or more actions may be performed. In some cases, upon receiving a confirmation from the occupant in the affirmative, a setting may be saved in a profile of the occupant based on the one or more actions performed and the one or more conditions under which the one or more actions are performed.

In one embodiment, at least one observation is made in relation to one or more words written by the occupant and/or one or more words spoken by the occupant. Upon generating a communication intended for the occupant, the manner in which the occupant communicates may be simulated in the communication. At least one observation may be made in relation to an identity of the occupant, a profile of the occupant, what action is performed, when an action is performed, who performs the action, where the action is performed, a device used to perform the action, an outside temperature, an indoor temperature, a state of one or more electronic devices before the action is performed, and/or a state of one or more electronic devices after the action is performed.

A computing device configured to obscure content on a screen is also described. The device may include a processor and memory in electronic communication with the processor. The memory may store instructions that may be executable by the processor to analyze data related to a premises and an occupant of the premises, make one or more observations based on the analysis of the data, and upon detecting one or more conditions associated with the one or more observations made, offer to perform one or more actions.

A computer-program product to obscure content on a screen is also described. The computer-program product may include a non-transitory computer-readable medium that stores instructions. The instructions may be executable by the processor to analyze data related to a premises and an occupant of the premises, make one or more observations based on the analysis of the data, and upon detecting one or more conditions associated with the one or more observations made, offer to perform one or more actions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation. More specifically, the systems and methods described herein relate to progressively profiling occupants of a premises in relation to a home automation system. Each occupant of the premises may be profiled separately and individually. Thus, a profile may be generated for each occupant of the premises based on observations the systems and methods make in relation to one or more actions taken by an occupant and the conditions under which the occupants takes the one or more actions. Based on the observations made, the systems and methods may communicate to the occupant an offer to perform the one or more actions. In some cases, the systems and methods may observe an occupant performing one or more actions that vary from the one or more actions the systems and methods already perform on behalf of the occupant. For example, every evening at dusk a system may dim the lights, turn down the thermostat, and close the blinds. The system may observe an occupant adjusting the set temperature of the thermostat.

In some cases, the system may observe that the occupant only adjusts the temperature from the set temperature on the weekends. Accordingly, the system may state that the occupant has been observed adjusting the thermostat on weekends. The system may offer to make this adjustment on behalf of the occupant on weekends. For example, the system may show the present settings for the weekend and show new settings the system may take on behalf of the occupant based on the observations the system has made. The system may show the present settings of the weekdays and ask whether to keep these settings as they are. In some cases, the systems and methods may monitor the manner in which an occupant communicates (e.g., email, text messages, conversations, etc.). Thus, upon learning the manner in which the occupant communicates, the systems and methods may communicate with the occupant in a similar manner, using words and phrases in a manner similar to the way the occupant uses them.

Figure 1:
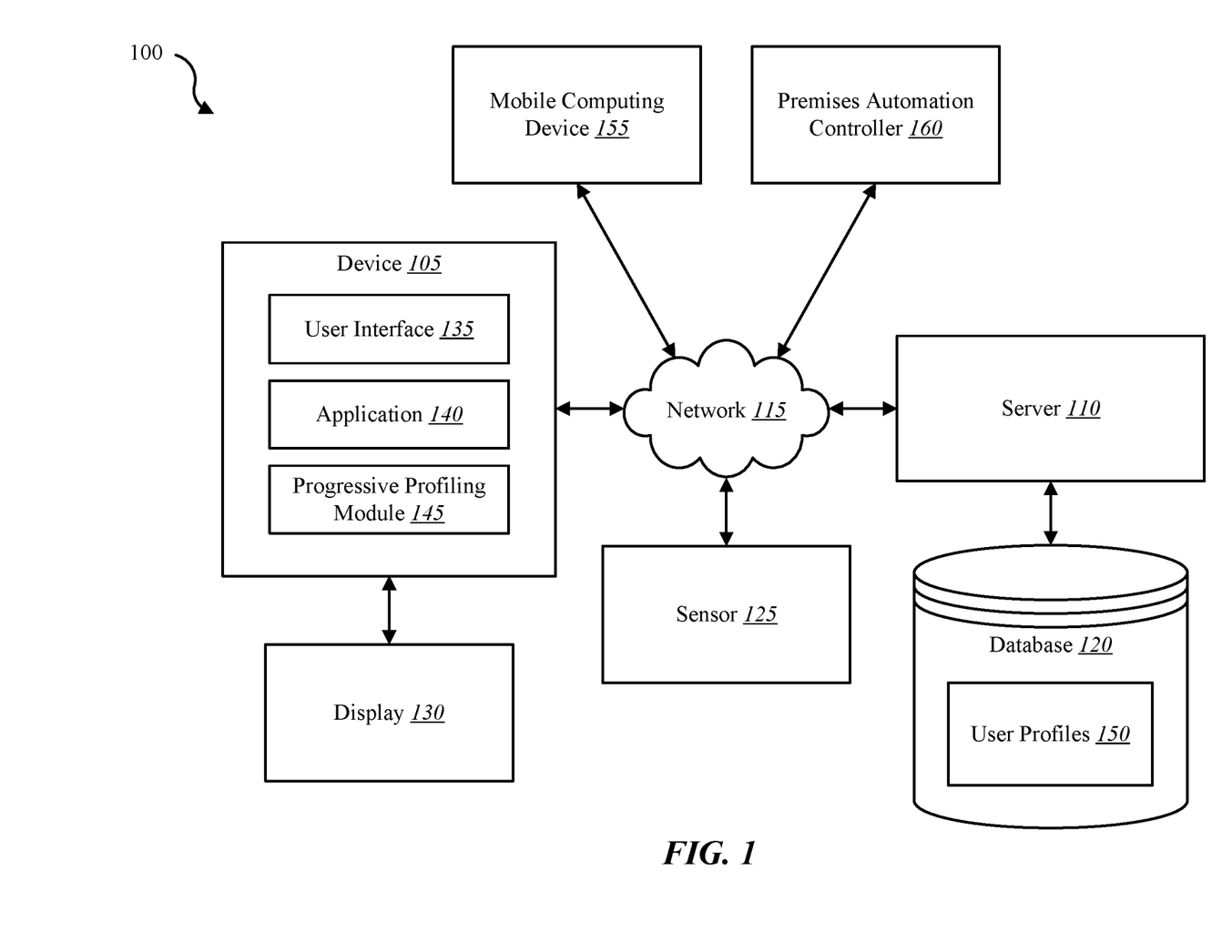
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, server 110, a sensor 125, a mobile computing device 155, a premises automation controller 160, and a network 115 that allows the device 105, the server 110, the mobile computing device 155, premises automation controller 160, and sensor 125 to communicate. Examples of the device 105 include mobile devices, smart phones, personal computing devices, computers, servers, premises automation controllers, premises security controllers, media content set top boxes, satellite set top boxes, cable set top boxes, DVRs, personal video recorders (PVRs), and the like. Examples of the premises automation controller 160 include a dedicated home automation computing device (e.g., wall-mounted controller), a personal computing device (e.g., laptop, desktop, etc.), a mobile computing device (e.g., tablet computing device, smartphone, etc.), and the like. Examples of the sensor 125 include a camera, three-dimensional (3-D) sensor, motion sensor, smoke sensor, glass break sensor, door sensor, window sensor, carbon monoxide sensor, and the like. Sensor 125 may also be integrated with a facial recognition system. Although sensor 125 is depicted as connecting to device 105 over network 115, in some embodiments, sensor 125 may connect directly to device 105.

In some configurations, the device 105 may include a user interface 135, application 140, and progressive profiling module 145. Although the components of the device 105 are depicted as being internal to the device 105 it is understood that one or more of the components may be external to the device 105 and connect to device 105 through wired and/or wireless connections. In some embodiments, application 140 may be located on mobile computing device 155 in order to allow a user to interface with a function of device 105 and/or progressive profiling module 145.

In some embodiments, device 105 may communicate with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include a progressive profiling module 145. For example, the device 105 may include the application 140 that allows the device 105 to interface with the premises automation controller 160 via the progressive profiling module 145 located on server 110. In some embodiments, the device 105, the premises automation controller 160, and the server 110 may include a progressive profiling module 145 where at least a portion of the functions of the progressive profiling module 145 are performed separately and/or concurrently on the device 105, mobile computing device 155, premises automation controller 160, and/or the server 110. In some embodiments, a user may access the functions of device 105 and/or premises automation controller 160 (directly or through device 105 via progressive profiling module 145) from mobile computing device 155. For example, in some embodiments, mobile computing device 155 includes a mobile application that interfaces with one or more functions of device 105, premises automation controller 160, progressive profiling module 145, and/or server 110.

In some embodiments, the server 110 may be coupled to database 120. For example, device 105 may access user profiles 150 in database 120 over the network 115 via server 110. Database 120 may be internal or external to the server 110. In one example, the device 105 may be coupled to database 120 via network 115.

Progressive profiling module 145 may allow a user to control (either directly or via premises automation controller 160) an aspect of the home of the user, including security, locking or unlocking a door, checking the status of a door, locating a person or item, controlling lighting, adjusting window coverings (blinds, curtains, shutters, etc.), adjusting thermostat devices, controlling cameras, and the like. In some configurations, application 140 may enable device 105 to interface with premises automation controller 160 via progressive profiling module 145 to provide home automation functions to device 105 and/or mobile computing device 155. Thus, application 140, via the progressive profiling module 145, may allow users to control aspects of their home. Further details regarding the progressive profiling module 145 are discussed below.

Figure 2:
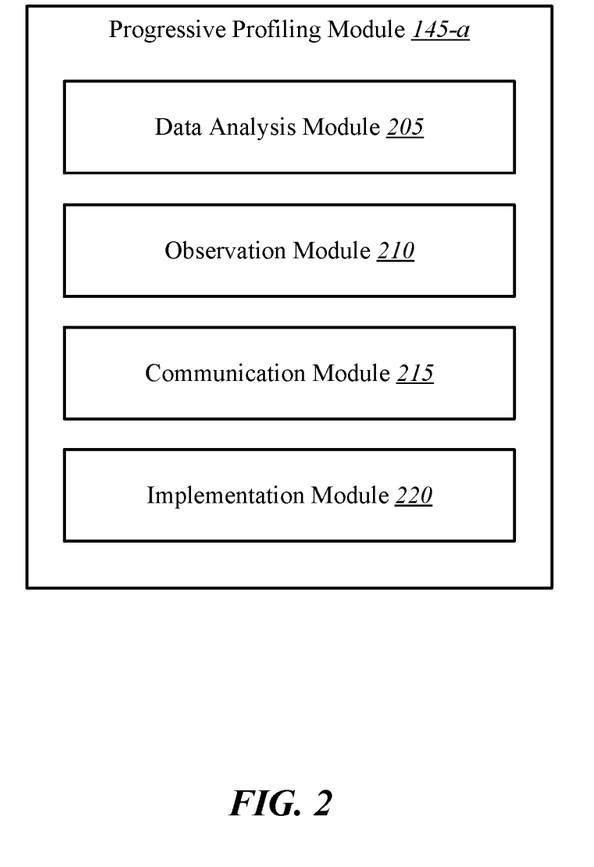
FIG. 2 is a block diagram illustrating one example of a progressive profiling module.

FIG. 2 is a block diagram illustrating one example of a progressive profiling module 145-*a*. The progressive profiling module 145-*a* may be one example of the progressive profiling module 145 depicted in FIG. 1. As depicted, the progressive profiling module 145-*a* may include a data analysis module 205, an observation module 210, a communication module 215, and an implementation module 220.

In one embodiment, data analysis module 205 may analyze data related to a premises and an occupant of the premises. Thus, data analysis module 205 may monitor the status of one or more areas of a premises, monitor the actions taken by an occupant of the premises, monitor the settings of an automation and/or security system, and the like. In some cases, data analysis module 205 may gather data from one or more sources, including sensors (e.g., motion sensor, light sensor, temperature sensor, camera, etc.), lights, light switches, remote actuated locking mechanisms, media delivery systems, and/or any device from which an input from one or more occupants of the premises may be received. In one embodiment, at least one observation may be made in relation to an identity of the occupant (e.g., facial recognition, device ID identification such as a key fob identifier, etc.), a profile of the occupant, what action is performed, when an action is performed, who performs the action, where the action is performed, a device used to perform the action, an outside temperature, an indoor temperature, a state of one or more electronic devices before the action is performed, and a state of one or more electronic devices after the action is performed. In one example, data analysis module 205 may detect that at a particular time of day, at a particular temperature indoors and/or outdoors, an occupant may adjust a thermostat, adjust a set of window coverings (e.g., blinds, curtains, shutters, etc.), adjust lighting, and so forth. In one embodiment, observation module 210 may make one or more observations based on the analysis of the data gathered. Upon detecting one or more present conditions associated with the one or more observations made, communication module 215 may offer to perform one or more actions on behalf of the occupant.

In some embodiments, communication module 215 may communicate to the occupant one or more observations. At least one of the observations may be based on the occupant previously performing one or more actions under one or more conditions. For example, communication module 215 may communicate to the occupant that it has been observed that the occupant adjusts the lights and temperature under certain circumstances. In some cases, communication module 215 may communicate to the occupant the conditions and/or circumstances in which the occupant has been observed to take the one or more actions. In one embodiment, communication module 215 may communicate to the occupant that presently the one or more conditions exist. Upon notifying the occupant that the one or more conditions exist, the system may offer to perform one or more actions on behalf of the occupant. In some embodiments, one or more observations may be made relative to one or more existing settings. For example, one or more automated settings may exist with regards to lighting in the premises.

The system may observe that under certain conditions, the occupant performs one or more actions that vary from the automated settings. Accordingly, the system may communicate to the occupant that one or more actions of the occupant that vary from the automated settings, and query whether the occupant would like the observed actions to be automated. The communication module 215 may communicate to the occupant the current settings, adjustments to the settings, how the adjustments affect the current settings, and query whether the occupant would like the adjustments to be implemented. In some cases, the data analysis module 205 may predict one or more conditions. Thus, the communication module 215 may offer to perform the one or more actions upon predicting one or more conditions before the one or more conditions occur. In one embodiment, communication module 215 may confirm with the occupant whether to perform the one or more actions offered. For example, communication module 215 may communicate an observation in relation to one or more actions taken by the occupant under one or more conditions, notify the occupant that the one or more conditions exist, offer to perform the one or more actions, and confirm whether the occupant would like the system to perform those actions on his or her behalf. Upon receiving a confirmation from the occupant in the affirmative, implementation module 220 may perform the one or more actions.

In some embodiments, upon receiving a confirmation from the occupant in the affirmative, implementation module 220 may save a setting in a profile of the occupant based on the one or more actions performed and the one or more conditions under which the one or more actions are performed. For example, implementation module 220 may save data related to the profiling of an occupant in a database of user profiles such as user profiles 150 stored in database 120. In some cases, at least one observation may be made in relation to one or more words written by the occupant. For example, data analysis module 205 may analyze email, text messages, and other written communication of an occupant to determine the writing style of the occupant. In some cases, at least one observation may be made in relation to one or more words spoken by the occupant. Thus, data analysis module 205 may analyze a conversation, a spoken query, and other spoken communication made by the occupant to determine a speech style of the occupant. Accordingly, in relation to the monitored communications of an occupant of the premises, communication module 215 may learn language characteristics of an occupant including slang, syntax, semantics, pragmatics, linguistics, connotation, pronunciation, exposition, exegetics, denotations, semiotics, verb usage, noun usage, subject-verb-object (SVO) usage, etc. In some cases, communication module 215 may save learned language characteristics in a profile associated with the occupant. Accordingly, communication module 215 may communicate with the occupant using the learned language characteristics of the occupant in order to communicate with the occupant using the same words the occupant uses, and using the words in the same way that the occupant uses the words to write and speak. Thus, upon generating a communication intended for the occupant, communication module 215 may simulate, in the generated communication, the manner in which the occupant communicates.

Figure 3:
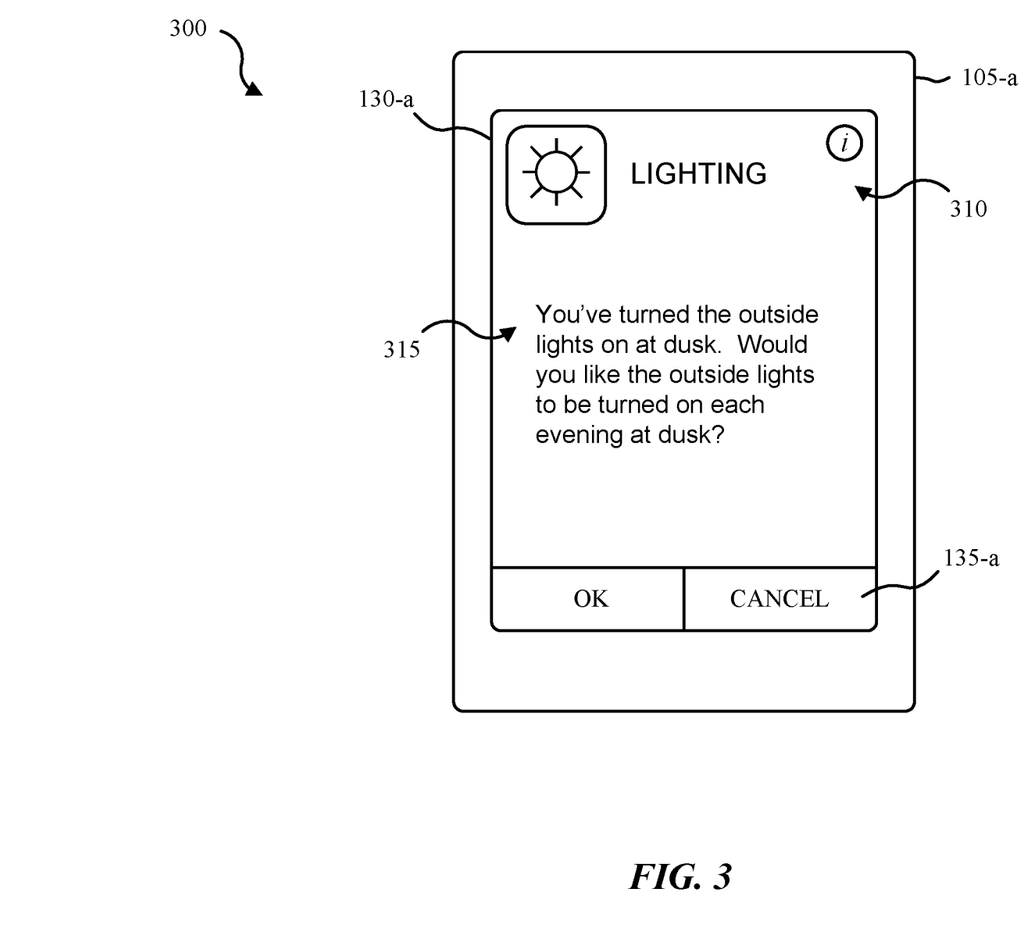
FIG. 3 is a block diagram illustrating one example of an environment for enabling progressive profiling of an occupant of a premises.

FIG. 3 is a block diagram illustrating one example of an environment 300 for enabling progressive profiling of an occupant of a premises. In some configurations, aspects of the environment 300 may be implemented by the progressive profiling module 145 illustrated in FIG. 1 or 2. In some configurations, aspects of the environment 300 may be implemented in conjunction with the application 140 and/or the user interface 135 illustrated in FIG. 1.

In one embodiment, environment 300 may include device 105-*a*. The device 105-*a* may be one example of the device 105 depicted in FIG. 1. Device 105-*a* may include a display 130-*a*. Display 130-*a* may be one example of the display 130 depicted in FIG. 1. Display 130-*a* may include a title section 310, a message section 315, and a user interface section 135-*a*. User interface section 135-*a* may be one example of user interface 135 depicted in FIG. 1. In one example, the title section 310 may include a symbol and/or one or more words to describe the affected system. For example, observations may be made with regards to a lighting system, a media system, a temperature control system, a humidity control system, a security system, and the like. As depicted, an observation is made with regards to a lighting system of the premises as depicted in the title section 310. Thus, the title section 310 includes a symbol for the lighting system and the word "LIGHTING" to provide a quick reference to any included message. Additionally, or alternatively, the title section 310 may include an information icon (e.g., the circle "i" icon depicted in title section 310) that may be configured to provide an occupant more information regarding the observation and/or the observation system when the occupant selects the icon.

In some embodiments, the display 130-*a* may include a message section 315. The message section 315 may include an observation made by the progressive profiling module 145. For example, the message section 315 may include the observation "I've noticed that you turn the outside lights on at dusk," as depicted in FIG. 3. Additionally, or alternatively, the message section 315 may include a suggested action the system could take on behalf of the occupant. In some cases, the message section 315 may present the suggested action in the form of a query with a confirmation request. Thus, the suggested action may be in the form of a query to enable the occupant to confirm that the suggested action will be performed on behalf of the occupant. Thus, as depicted, the message section 315 may include the query, "Would you like me to turn the outside lights on each evening at dusk for you?" In some cases, the progressive profiling module 145 may include one or more follow-up queries to confirm a suggested action. Accordingly, the message section 315 may include a confirmation request such as "Would you like me to perform this action every day?" or "Would you like me to perform this action even when the premises is empty?" and so forth. As depicted, the display 130-*a* may show a user interface section 135-*a*. The user interface section 135-*a* may provide a means whereby an occupant may provide a reply in response to a query included in the message section 315. For example, the user interface section 135-*a* may include a button titled "OK" and another button titled "CANCEL," as depicted in FIG. 3. Accordingly, upon detecting the occupant pressing the "OK" button, the system may determine that the occupant wants the progressive profiling module 145 to perform the indicated action on behalf of the occupant. Upon detecting the occupant pressing the "CANCEL" button, the system may determine that the occupant does not want the action performed on his or her behalf. In some embodiments, upon receiving a negative confirmation (i.e., the occupant pressing the "CANCEL" button), the progressive profiling module 145 may communicate one or more follow-up queries to the occupant to determine whether the occupant wants one or more actions performed on his or her behalf under different circumstances.

Figure 4:
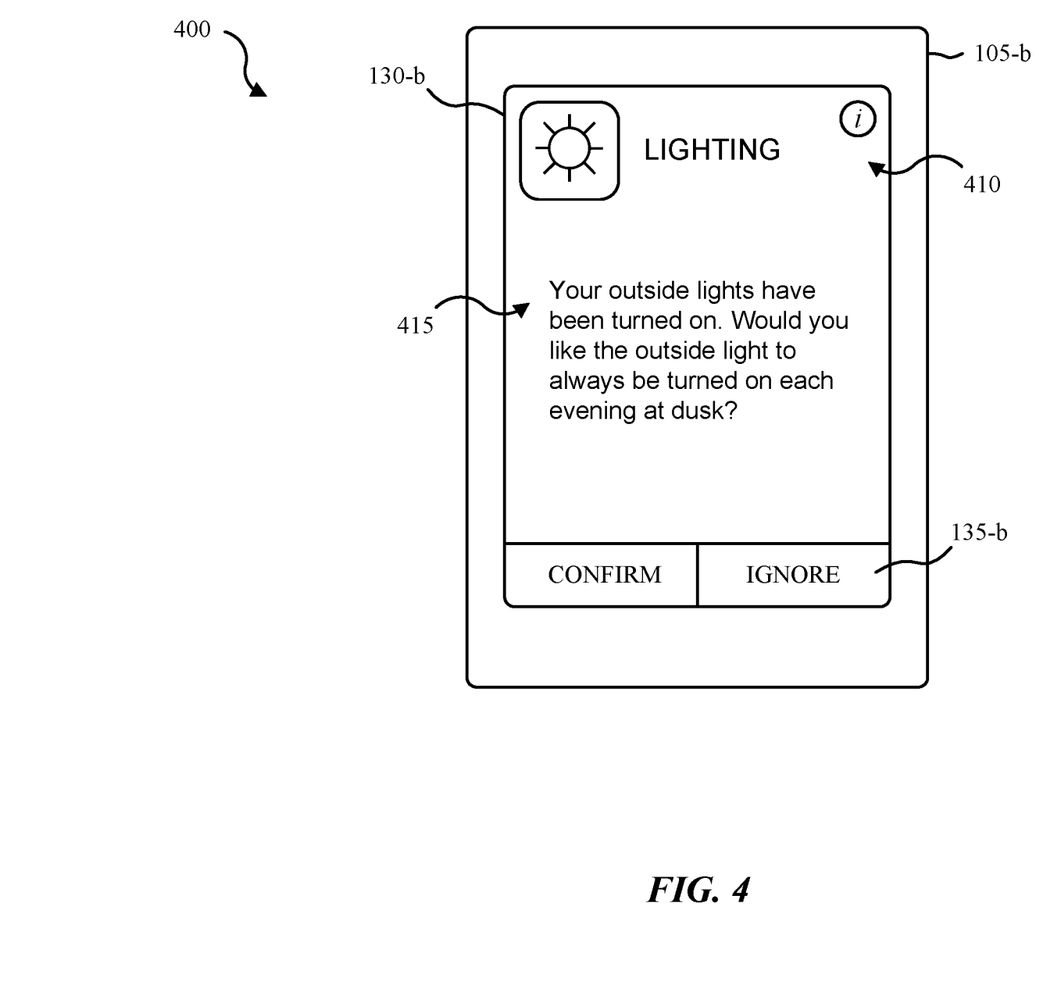
FIG. 4 is a block diagram illustrating another example of an environment for enabling progressive profiling of an occupant of a premises.

FIG. 4 is a block diagram illustrating another example of an environment 400 for enabling progressive profiling of an occupant of a premises. In some configurations, aspects of the environment 400 may be implemented by the progressive profiling module 145 illustrated in FIG. 1 or 2. In some configurations, aspects of the environment 400 may be implemented in conjunction with the application 140 and/or the user interface 135 illustrated in FIG. 1.

In one embodiment, environment 400 may include device 105-*b*. The device 105-*b* may be one example of the device 105 depicted in FIGS. 1 and/or 3. Device 105-*b* may include a display 130-*b*. Display 130-*b* may be one example of the display 130 depicted in FIGS. 1 and/or 3. Display 130-*b* may include a title section 410, a message section 415, and a user interface section 135-*b*. User interface section 135-*b* may be one example of user interface 135 depicted in FIGS. 1 and/or 3. In one example, the title section 410 may include a symbol and/or one or more words to describe the affected system. As depicted, an observation is made with regards to a lighting system of the premises as depicted in the title section 410.

In some embodiments, the display 130-*b* may include a message section 415. The message section 415 may include an observation made by the progressive profiling module 145. In some cases, the message section 415 may include a suggested action and a confirmation request. For example, the message section 415 may include the observation "Your outside lights have been turned on," as depicted in FIG. 4. Additionally, or alternatively, the message section 415 may include a suggested action the system could take on behalf of the occupant. In some cases, the message section 415 may present the suggested action in the form of a query with a confirmation request. The suggested action may be in the form of a query to enable the occupant to confirm that the suggested action will be performed on behalf of the occupant. Thus, as depicted, the message section 415 may include the query, "Would you like the outside light to always be turned on each evening at dusk?" As depicted, the display 130-*b* may show a user interface section 135-*b*. The user interface section 135-*b* may provide a means whereby an occupant may provide a reply in response to a query included in the message section 415. For example, the user interface section 135-*b* may include a button titled "CONFIRM" and another button titled "IGNORE," as depicted in FIG. 4. Accordingly, upon detecting the occupant pressing the "CONFIRM" button, the system may confirm that the occupant wants the progressive profiling module 145 to perform the indicated action on behalf of the occupant. Upon detecting the occupant pressing the "IGNORE" button, the system may determine that the occupant does not want the action performed on his or her behalf. In some embodiments, upon receiving a negative confirmation (i.e., the occupant pressing the "IGNORE" button), the progressive profiling module 145 may communicate one or more follow-up queries to the occupant to determine whether the occupant wants one or more actions performed on his or her behalf under different circumstances.

Figure 5:
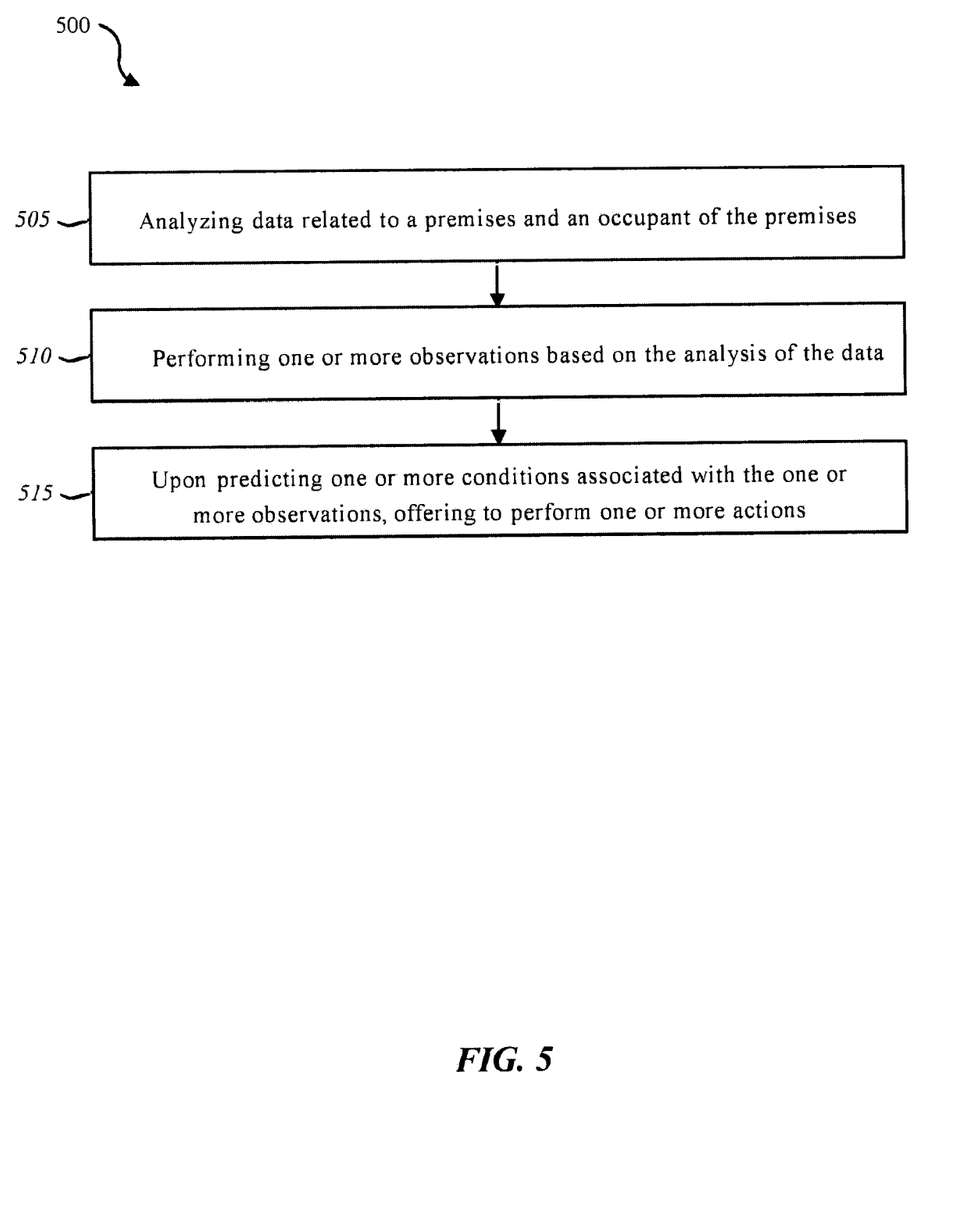
FIG. 5 is a flow diagram illustrating one embodiment of a method for receiving a user input to control home automation via a media set top box.

FIG. 5 is a flow diagram illustrating one embodiment of a method 500 for receiving a user input to control home automation via a media set top box. In some configurations, the method 500 may be implemented by the progressive profiling module 145 illustrated in FIG. 1 or 2. In some configurations, the method 500 may be implemented in conjunction with the application 140 and/or the user interface 135 illustrated in FIG. 1.

At block 505, data related to a premises and an occupant of the premises may be analyzed. At block 510, one or more observations may be performed based on the analysis of the data. In some cases, at least one observation is made in relation to one or more words written and/or spoken by the occupant. In one embodiment, the progressive profiling module 145 may communicate with the occupant using words in the same way as the occupant uses the words to write and speak. Upon generating a communication intended for the occupant, the progressive profiling module 145 may simulate the manner in which the occupant communicates. At block 515, upon predicting one or more conditions associated with the one or more observations made, one or more actions may be offered to be performed.

Figure 6:
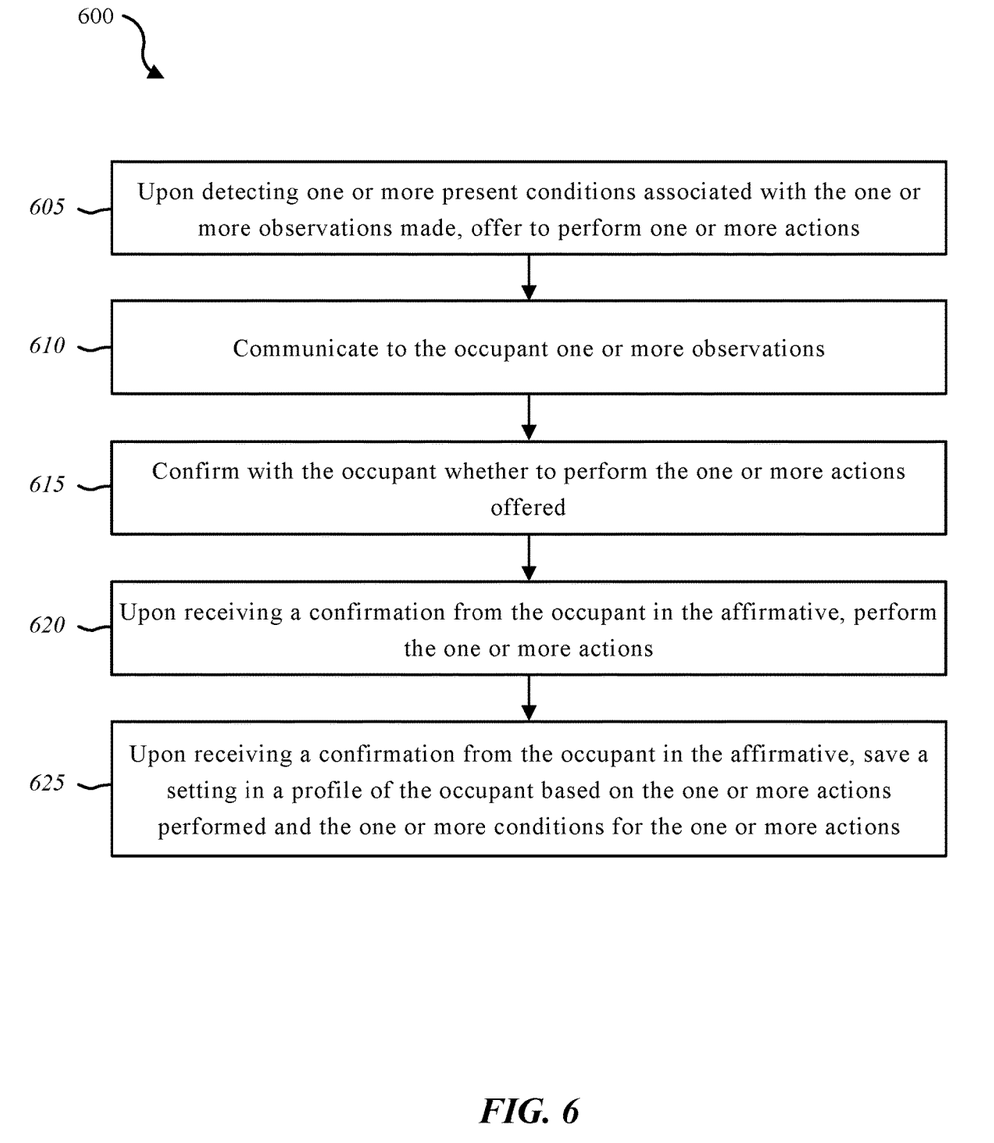
FIG. 6 is a flow diagram illustrating one embodiment of a method for automatically adjusting, via a media set top box, an aspect of a home automation system based on a detected action of a user.

FIG. 6 is a flow diagram illustrating one embodiment of a method 600 for automatically adjusting, via a media set top box, an aspect of a home automation system based on a detected action of a user. In some configurations, the method 600 may be implemented by the progressive profiling module 145 illustrated in FIG. 1 or 2. In some configurations, the method 800 may be implemented in conjunction with the application 140 and/or the user interface 135 illustrated in FIG. 1.

At block 605, upon detecting one or more present conditions associated with the one or more observations made, one or more actions may be offered to be performed. At block 610, one or more observations may be communicated to the occupant. At least one of the observations may be based on the occupant previously performing one or more actions under one or more conditions. In some cases, at least one of the observations may be based on the occupant previously performing one or more actions under one or more conditions. At block 615, it may be confirmed with the occupant whether to perform the one or more actions offered. At block 620, upon receiving a confirmation from the occupant in the affirmative, the one or more actions may be performed. At block 625, upon receiving a confirmation from the occupant in the affirmative, a setting may be saved in a profile of the occupant based on the one or more actions performed and the one or more conditions associated with the one or more actions, or the conditions under which the one or more actions are performed.

Figure 7:
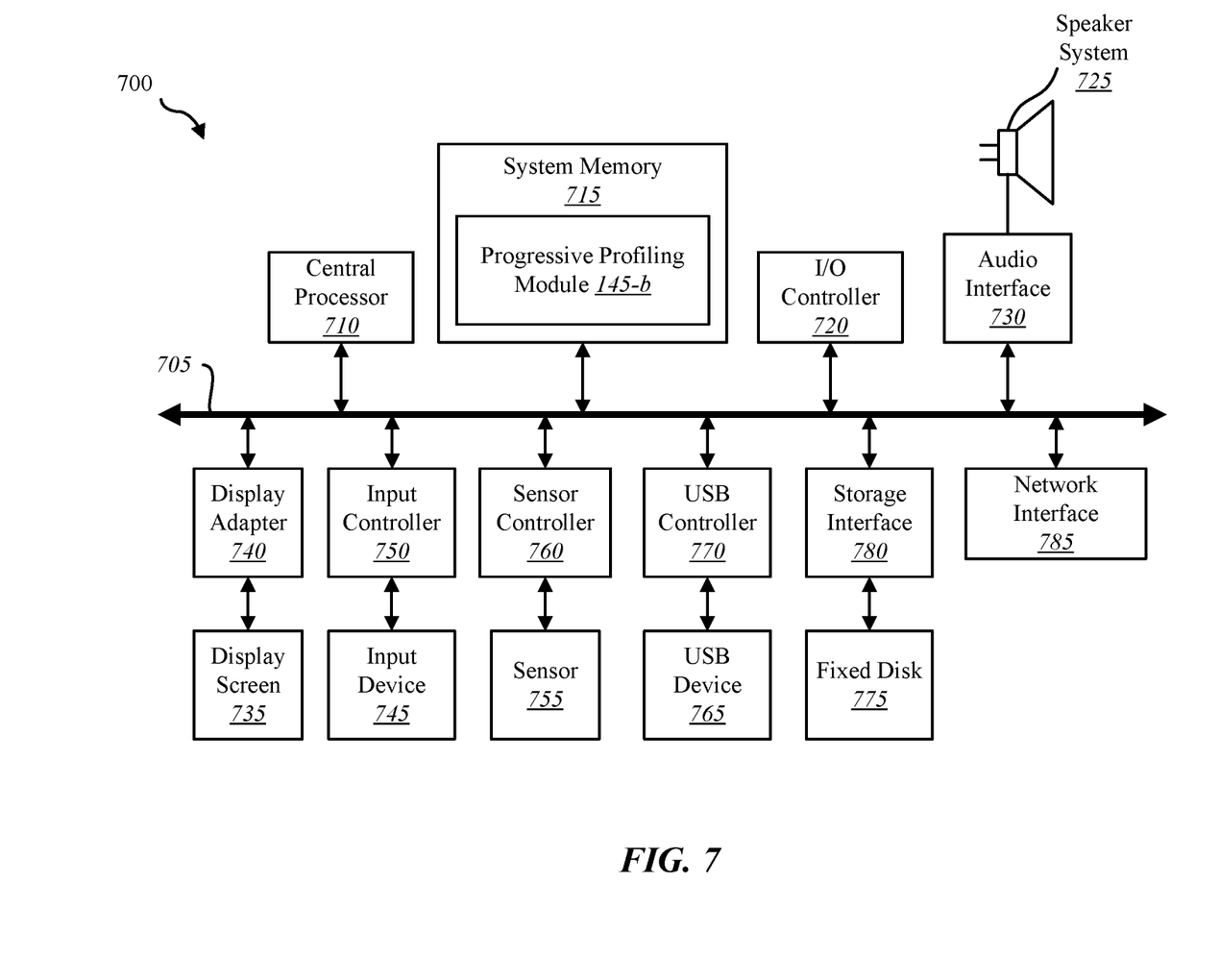
FIG. 7 depicts a block diagram of a computer system suitable for implementing the present systems and methods.

FIG. 7 depicts a block diagram of a controller 700 suitable for implementing the present systems and methods. The controller 700 may be an example of the set top box device 105, mobile computing device 155, and/or premises automation controller 160 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the progressive profiling module 145-b to implement the present systems and methods may be stored within the system memory 715.

Applications (e.g., application 140) resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for progressively profiling each occupant of a premises, the method comprising:
   analyzing data related to the premises and an occupant of the premises;
   performing one or more observations based on the analysis of the data, at least one of the one or more observations being based at least in part on the occupant previously performing one or more actions under a plurality of conditions at a time;
   predicting the plurality of conditions associated with the one or more observations;
   generating a communication indicating to the occupant that the plurality of conditions in which the occupant has been observed to take the one or more actions have been predicted;
   offering, in the generated communication, to perform the one or more actions previously performed by the occupant under the predicted plurality of conditions before the plurality of conditions occur; and
   upon receiving a confirmation from the occupant in the affirmative, performing the one or more actions.

2. The method of claim 1, further comprising:
   communicating to the occupant the one or more observations.

3. The method of claim 1, wherein at least one of the one or more observations includes observing language characteristics used by the occupant when performing the one or more actions.

4. The method of claim 3, wherein at least a portion of the generated communication is formulated based at least in part on the observed language characteristics previously used by the occupant when performing the one or more actions.

5. The method of claim 1, wherein the one or more actions comprise the occupant interacting with one or more electronic devices and altering, based at least in part on the interacting, a state of the one or more electronic devices.

6. The method of claim 1, further comprising:
   upon receiving the confirmation from the occupant in the affirmative, saving a setting in a profile of the occupant based on the one or more actions performed and the plurality of conditions under which the one or more actions are performed.

7. The method of claim 1, wherein at least one observation is made in relation to one or more words written by the occupant.

8. The method of claim 1, further comprising:
   communicating to the occupant the plurality of conditions under which the occupant has been observed previously performing the one or more actions.

9. The method of claim 1, further comprising:
   notifying the occupant that the plurality of conditions exist.

10. The method of claim 1, wherein at least one observation is made in relation to at least one of an identity of the occupant, a profile of the occupant, what action is performed, when an action is performed, who performs the action, where the action is performed, a device used to perform the action, an outside temperature, an indoor temperature, a state of one or more electronic devices before the action is performed, and a state of one or more electronic devices after the action is performed.

11. A computing device configured for progressive profiling in a home automation system, comprising:
   a processor;
   memory in electronic communication with the processor;
   instructions stored in the memory, the instructions being executable by the processor to:
      analyze data related to a premises and an occupant of the premises;
      perform one or more observations based on the analysis of the data, at least one of the one or more observations being based at least in part on the occupant previously performing one or more actions under a plurality of conditions at a time;
      predict the plurality of conditions associated with the one or more observations;
      generate a communication indicating to the occupant that the plurality of conditions in which the occupant has been observed to take the one or more actions have been predicted;
      offer, in the generated communication, to perform the one or more actions previously performed by the occupant under the predicted plurality of conditions before the plurality of conditions occur; and upon receiving a confirmation from the occupant in the affirmative, perform the one or more actions.

12. The computing device of claim 11, wherein the instructions are executable by the processor to:

communicate to the occupant the one or more observations.

13. The computing device of claim 11, wherein at least one of the one or more observations includes observing language characteristics used by the occupant when performing the one or more actions.

14. The computing device of claim 13, wherein at least a portion of the generated communication is formulated based at least in part on the observed language characteristics previously used by the occupant when performing the one or more actions.

15. The computing device of claim 11, wherein the one or more actions comprise the occupant interacting with one or more electronic devices and altering, based at least in part on the interacting, a state of the one or more electronic devices.

16. The computing device of claim 11, wherein the instructions are executable by the processor to:

upon receiving the confirmation from the occupant in the affirmative, save a setting in a profile of the occupant based on the one or more actions performed and the plurality of conditions under which the one or more actions are performed.

17. The computing device of claim 11, wherein the instructions are executable by the processor to:

communicate to the occupant the plurality of conditions under which the occupant has been observed previously performing the one or more actions.

18. The computing device of claim 11, wherein at least one observation is made in relation to at least one of an identity of the occupant, a profile of the occupant, what action is performed, when an action is performed, who performs the action, where the action is performed, a device used to perform the action, an outside temperature, an indoor temperature, a state of one or more electronic devices before the action is performed, and a state of one or more electronic devices after the action is performed.

19. A computer-program product for progressive profiling, by a processor, in a home automation system, the computer-program product comprising a non-transitory computer-readable medium storing instructions thereon, the instructions being executable by the processor to:

analyze data related to a premises and an occupant of the premises;

perform one or more observations based on the analysis of the data, at least one of the one or more observations being based at least in part on the occupant previously performing one or more actions under a plurality of conditions at a time;

predict the plurality of conditions associated with the one or more observations;

generate a communication indicating to the occupant that the plurality of conditions in which the occupant has been observed to take the one or more actions have been predicted;

offer, in the generated communication, to perform the one or more actions previously performed by the occupant under the predicted plurality of conditions before the plurality of conditions occur; and upon receiving a confirmation from the occupant in the affirmative, perform the one or more actions.

20. The computer-program product of claim 19, wherein the instructions are executable by the processor to:

upon receiving the confirmation from the occupant in the affirmative, save a setting in a profile of the occupant based on the one or more actions performed and the plurality of conditions under which the one or more actions are performed.

* * * * *